C. M. MARCH.
STOP MECHANISM FOR CAMERA FRONTS.
APPLICATION FILED AUG. 14, 1913.

1,233,095. Patented July 10, 1917.

Witnesses:
Marion C. Hobby
Ida S. Clement

Inventor:
Charles M. March
by Ellis Spear Jr.
Attorney.

UNITED STATES PATENT OFFICE.

CHARLES MINOT MARCH, OF PORTLAND, MAINE.

STOP MECHANISM FOR CAMERA-FRONTS.

1,233,095.      Specification of Letters Patent.      Patented July 10, 1917.

Application filed August 14, 1913. Serial No. 784,723.

*To all whom it may concern:*

Be it known that I, CHARLES M. MARCH, a citizen of the United States, residing at Portland, county of Cumberland, State of Maine, have invented certain new and useful Improvements in Stop Mechanism for Camera-Fronts, of which the following is a specification.

This invention relates to cameras and particularly to such cameras as are constructed with a front adjustment of the bellows which may be either the usual vertically rising and falling front alone or this adjustment combined with an additional horizontal adjustment. In either case it is of great importance to prevent any accidental creasing of the bellows along any other lines than those of the predetermined plaiting or folding.

Most camera bellows are made of fine leather lined with cloth and are carefully creased into folds so that the bellows will collapse and fit smoothly and snugly between the folding front and back of the camera when it is closed. Should the bellows become accidentally creased along any other line or lines than those of its natural fold, there would not only be a permanent tendency to jam within the camera but a liability to puncture the bellows walls thus admitting light and spoiling the camera. These conditions are so well known as not to require extended discussion, in fact most cameras are sent from the factory with a notice or caution warning the user to see to it that the lens is centered before collapsing the bellows in order to avoid injury thereto.

The object of my invention is to make it impossible to collapse the bellows without first restoring the parts to a proper alinement from which position the bellows will collapse freely and evenly. This object I effect through a stop mechanism placed in combination with the rising and folding front or in any other suitable relation to the bellows so as to lock the parts against collapsing movement until the proper folding alinement is secured. The construction and operation of my device will be more fully described in the specification which follows.

In the drawings accompanying that specification I have shown a form of stop mechanism especially designed for use with a camera having both a vertically and a horizontally adjustable front.

Throughout specification and drawings like reference numerals are employed to indicate corresponding parts, and in the drawings,—

Figure 1:
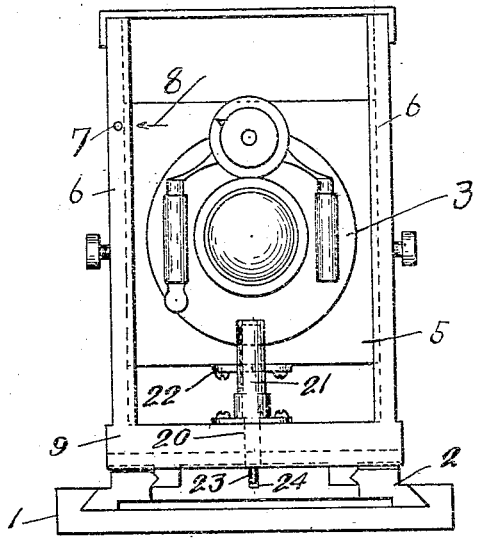
Figures 1 and 2 are front views of a camera having a combined vertically and horizontally sliding front.
Figure 2:
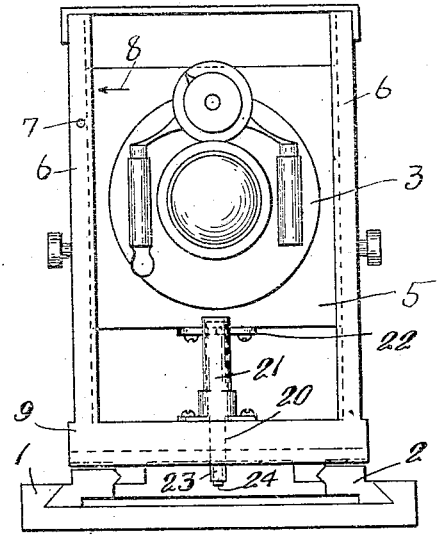
Figure 3:
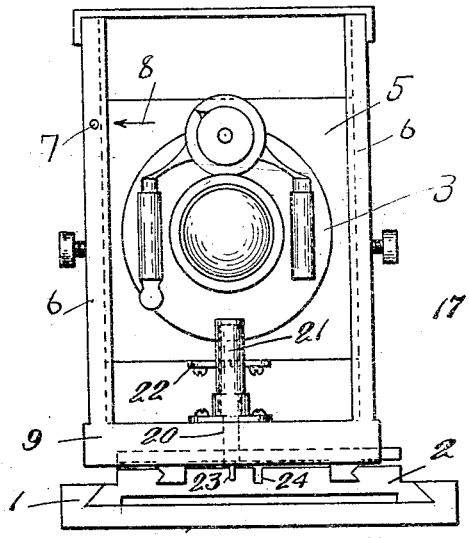
Fig. 3 is a view showing the camera in horizontally adjusted position.
Figures 4, 5:
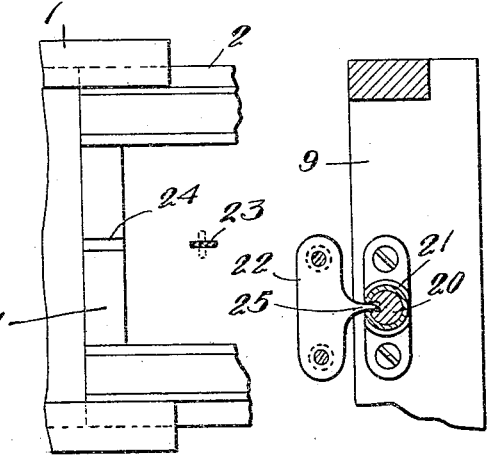

Figs. 4 to 7 inclusive are detail views of the stop mechanism.

In addition, the entire front including the extension slides 1 and 2 and the lens board is capable of a horizontal movement with the base block 9 of the front so that the center of the lens may be moved to either side of the vertical center line of the plate.

I have indicated at 1 and 2 the extension slides upon which the front 3 is mounted. The usual bellows (not shown) is fastened to the lens board 5 at its front end and to the camera box at its rear end, and is adapted to fold back into the camera box (not shown) when the front is pushed back.

The lens board 5 is capable of a vertical sliding movement in the front stays 6 so that the center of the lens may be moved above or below the horizontal center line of the plate, thereby securing in the picture more or less as desired of the upper or lower part of the object or view being photographed. Running back the front without first centering the lens makes liable the folding of the bellows in folds other than their natural ones, thus ruining the bellows. On most cameras a pin 7 is mounted in the front standard and an arrow 8 is located on the lens board to indicate when the lens is properly centered and the bellows can be folded properly.

To prevent the front from being run back unless the lens is properly centered, I provide a rotatably mounted core or spindle carrying an engaging member and so connected with the lens board as to turn with every vertical movement thereof to vary the effective engaging position of the engaging member.

I have indicated at 20 such a core or spindle which turns within a casing 21 secured to the base block 9 under the influence of an engaging point 25 on a plate 22 secured to the lower face of the lens board so as to move with the movement thereof. The core 20 extends through the base block and has a projecting blade 23 extending down below the base block and ordinarily positioned in non-interfering relation to the movement of the camera front in and out on its track by reason of a groove 24 of a less width than the width of the blade cut in the back cross bar 17 of the frame of the track through which groove the blade normally passes. The blade becomes effective, however, as soon as the front is either raised or lowered and turns so that it approaches sidewise relative to the groove 24 and being too wide strikes against the cross bar 17 and prevents further backward movement of the lens board. In the sliding sidewise movement of the lens board the initial movement thereof to either side carries the projecting blade out of alinement with the groove 24 so that it can not pass through it and striking against the cross bar stop the backward movement of the lens board. Neither the core nor the blade are turned in this horizontal movement, the destruction of the alinement preventing the blade from entering the groove.

Figures 6, 7:
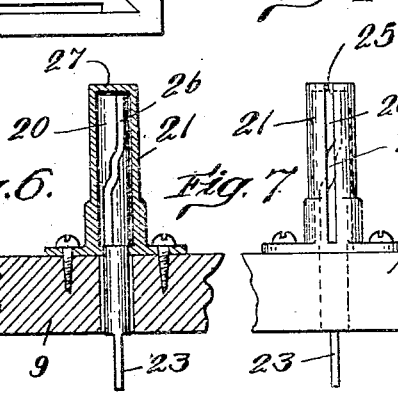

The turning of the blade is accomplished by means of the plate 22 which travels with the lens board and has a laterally projecting knob or point 25 which enters a slot 25′ extending from end to end of the casing 21 and engages in a groove 26 of peculiar shape in the core 20 to rotate the same. Referring to Figs. 6 and 7 the shape of this groove 26 will be seen. This groove runs the entire length of the core on the side next to the bellows. Normally, the point 25 lies at the center of the groove and inasmuch as the core is fixed or stationary in its casing except for a revolving movement the plate 22 will, if moved up or down, compel the core to turn through a part of a revolution. This is so because the groove or channel 26 is not in a direct line. Starting from the top when in normal position the channel runs straight down as shown in Fig. 7 until it nearly reaches the center where it curves toward the center in a direction toward the bellows. From the lower edge of the core the channel runs up from a point opposite the starting point at the top edge and straight upwardly until it nearly reaches the center where it curves in a direction toward the bellows until it meets and merges into the curved section of the upper part of the channel. The point of the plate 22 therefore in following this channel and moving upwardly or downwardly, during its initial movement from the central or normal point turns the core one quarter of a revolution.

The slot 25′ in the casing 21 extends the entire length thereof. To prevent the core from being dropped out of the casing should the camera be inverted I provide a cap 27 for the casing which partially closes the same but does not overlie the slot 25′ in the casing to interfere with the free upward movement of the point 25 of the plate 22.

The operation of this form of stop mechanism is as follows: When the lens board is in normal position as shown in Fig. 1, the blade 23 can slide through the groove 24 in the cross bar 17, after the initial upward or downward movement of the plate 22 which through the point 25 and channel 26 in the core 20 turns the core one quarter of a revolution and turns the blade 23 sidewise so that it can not enter the groove 24 but strikes against the cross bar 17 preventing further backward movement of the front until the lens board is restored to normal position. From this it will be seen that the essential point of this form of locking mechanism is the disturbing of the alinement of the blade 23 with respect to the groove 24 in the cross bar 17.

In the application of this mechanism to smaller cameras which have no cross bar on the frame of the track in which a groove may be cut for the blade 23 to run in, I find it necessary to secure to the bottom or bed of the track two small spaced strips of angle metal which answers the same purpose as the groove.

My stop mechanism is of compact construction and may therefore be used on the most compact camera constructions, as for example, the folding pocket camera. The mechanism avoids the use of springs and can be applied to any standard make of camera at a low cost. The mechanism is effective as soon as the lens board is moved out of the center even for the fractional part of an inch, and will effectually prevent the bellows from being improperly folded should the lens board be out of center.

Obviously, the principle involved will admit of many other modifications in construction to adapt it to different makes of cameras. I therefore regard as contemplated by the spirit of my invention any changes within the limits of the appended claims.

What I therefore claim and desire to secure by Letters Patent is:

1. In a camera the combination of a vertically and horizontally adjustable front having a predetermined folding position, a locking mechanism effectively disposed relative to said front and controlled by the movement thereof to prevent said front from closing unless in said predetermined folding position.

2. In a camera the combination of a vertically and horizontally adjustable front having a predetermined folding position, a locking mechanism normally alined relative to said predetermined folding position, an obstruction effectively barring said locking mechanism in any other than its proper closing position and means for operating said locking mechanism upon the vertical adjustment of said front.

3. In a camera the combination of a vertically and horizontally adjustable front having a predetermined folding position, a locking blade, a barrier for said locking blade having an opening therethrough, said opening being alined with said blade when said lock is in said closing position and means for turning said blade to destroy its alinement with said opening upon the vertical movement of said front.

4. In a camera the combination of a vertically and horizontally adjustable front having a predetermined closing position, a locking blade rotatably mounted on said front, a barrier having an opening normally alined with said locking mechanism when said locking mechanism is in said closing position and means for rotating said blade upon the vertical adjustment of said front for the purpose of preventing the front from closing unless it is in said predetermined closing position.

5. In a camera the combination of a vertically adjustable front having an alined folding position, a rotary locking mechanism and an obstruction and an operative connection between said front and said locking mechanism to turn said lock to engage said obstruction when said front is in other than alined position.

6. In a camera, the combination of a vertically adjustable front having an alined folding position, a locking mechanism for said front in any position other than its folding position including a locking member carried by the front and turnable in either direction, an obstruction with respect to which said member is turned, and a member movable with the front for turning said locking member in one direction relative to said obstruction upon a vertical movement of the front upwardly and for turning said member in the opposite direction upon a downward movement of the front.

7. In a camera, the combination of a vertically and horizontally adjustable front having an alined folding position, a locking member, a barrier for said member having an opening through which said locking member may pass only when the front is in its folding position, and means operatively connected with the front for moving said locking member to non-alined position relative to the opening of said obstruction upon a vertical movement of the front.

8. In a camera, the combination of a vertically and horizontally adjustable front having an alined folding position, a turnable locking member having an alined and a non-alined position, a barrier for said member having an opening through which said locking member may pass only when said member is in alined position, and means operatively connected with the front for turning said locking member to non-alined position relative to the opening of said obstruction upon a vertical movement of the front, said means ineffective to turn said member upon a lateral movement of the front but said lateral movement carrying said member to non-alined position.

9. In a camera, the combination of a vertically adjustable front having an alined folding position, a rotatable locking member having a locking blade and having a groove therein deflected out of the straight line between the ends of said member, a barrier having an opening with which said blade is normally alined and relative to which said blade is arranged to be turned, and a member operatively connected to said front and having engagement in said groove to turn said locking member upon a vertical movement of the front and destroy the alinement of said blade with said opening of the barrier.

10. In a camera, the combination of a vertically adjustable front having an alined folding position, a rotatable locking member having a locking blade and having a groove therein deflected out of the straight line between the ends of said member, a barrier having an opening with which said blade is normally alined and relative to which said blade is arranged to be turned, and a member operatively connected to said front and having a normal engagement in said groove between the ends thereof when the front is in alined position and having turning engagement in said groove at one extreme thereof upon an upward movement of the front effective to turn the blade in one direction relative to the opening of said barrier and having a turning engagement in the opposite end of said groove upon a downward movement of the front effective to turn the blade in the opposite direction relative to the opening of said barrier.

In testimony whereof I affix my signature in presence of two witnesses.

CHARLES MINOT MARCH.

Witnesses:
CHESTER M. FOSS,
BERTRAND G. MARCH.

Copies of this patent may be obtained for five cents each, by addressing the "Commissioner of Patents, Washington, D. C."